G. A. CLINGWALD.
ELECTRIC INDICATING DEVICE FOR SIGNALS.
APPLICATION FILED APR. 14, 1910.
1,044,021.
Patented Nov. 12, 1912.
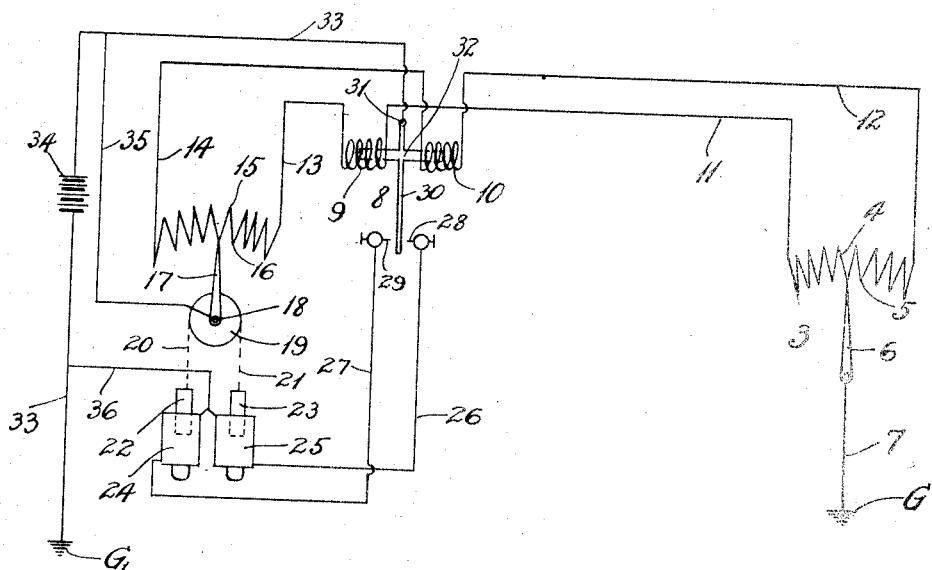
Witnesses
E. R. Pollard
F. D. Ammen
Inventor
Gustaf A. Clingwald
by Hazard Strauss
Atty.

UNITED STATES PATENT OFFICE.

GUSTAF A. CLINGWALD, OF EDISON, CALIFORNIA, ASSIGNOR OF ONE-HALF TO THOMAS J. ROYER, OF AQUEDUCT, CALIFORNIA.

ELECTRIC INDICATING DEVICE FOR SIGNALS.

1,044,021.     Specification of Letters Patent.     Patented Nov. 12, 1912.

Application filed April 14, 1910. Serial No. 555,446.

*To all whom it may concern:*

Be it known that I, GUSTAF A. CLINGWALD, a citizen of Sweden, residing at Edison, in the county of Kern and State of California, have invented new and useful Improvements in Electric Indicating Devices for Signals, of which the following is a specification.

This invention relates to electric indicating devices or telegraphs which may be used for signaling between distant points.

The object of the invention is to provide a simple arrangement by means of which a moving indicator or pointer at one point may affect a similar pointer by electric means so that the distant instrument will duplicate the movements made at the sending instrument.

The annexed drawing which fully illustrates my invention, is a diagrammatic view.

Referring more particularly to the parts, 3 represents the sending instrument which consists essentially of a resistance coil 4 having contact points 5 arranged circumferentially about the axis of rotation of a stem carrying pointer or contact finger 6. The inner end of the contact finger or pointer 6 is connected by a conductor 7 with the ground at G. The mechanism of the receiving instrument includes a double solenoid 8 comprising a pair of oppositely disposed solenoid coils 9 and 10, the former of which is disposed at the left and connected by a suitable conductor 11 with the left end of the resistance coil 4. The coil 10 is connected by a suitable conductor 12 with the other end of the coil 4. The ends of the coils 9 and 10 are connected respectively by conductors 13 and 14 with the ends of the resistance coil 15 which is similar to the coil 4 and presenting contact points 16 arranged circumferentially so as to coöperate with a driven indicator pointer or contact finger 17 attached to a rotatable stem 18. The stem 18 carries a rigid pulley 19 over which passes a cord having pendent ends 20 and 21 which support solenoid cores 22 and 23 respectively. These cores 22 and 23 are controlled by coils 24 and 25 connected respectively by conductors 27 and 26 with adjustable contact points 28 and 29. Between the contact points 28 and 29 a contact pendulum 30 hangs down from a pivot 31 and this pendulum supports a solenoid core or armature 32, the ends of which are received respectively in the coils 9 and 10.

The conductor 33 extends from the ground $G^1$ through the pivot pin 31 and in this conductor a battery or source of current 34 is placed. The branch conductor 35 connects the stem 18 with the conductor 33 beyond the battery 34, that is, on the side of the conductor remote from the ground $G^1$. Another branch conductor 36 extends from the conductor 33 near the ground $G^1$ with the solenoids 24 and 25 arranged in parallel.

The mode of operation of the invention will now be described.

When the pointers 16 and 17 are in the position shown in the diagram, the current passes from the ground $G^1$ to the battery 34. In this position of the pointers they contact with the middle point of their resistance coils so that the resistance of a current flowing in each direction from the pointer will be the same in the active half of each coil. At the coil 15 the current divides passing through each half of this coil and through conductors 13 and 14, through the coils 9 and 10; thence the current passes by the conductors 11 and 12 to the coil 4 and thence to the ground G. It will be seen that the current passes by two routes between the pointers, and the resistance of these two routes is normally the same. For this reason the current in the coils 9 and 10 will be normally the same and the pendulum will hang in its normal vertical position. If the pointer 6 should be moved from mid position, for instance if it should be moved toward the right, the resistance in the current flowing through the conductor 12 will be reduced and this will increase the current through this conductor and through the coil 10 of the solenoid 8, this will draw the pendulum 30 over against the contact point 28 and close the secondary metallic circuit through the conductor 26 and through the coil 25 and conductor 36. The current flowing in the coil 25 will attract the core 23 and rotate the pulley 19 and the pointer 17 rigidly secured thereto. The arrangement is such that the degree of movement of the pointer 17 will be the same as the amount of displacement of the pointer 6. A movement in the opposite direction will produce a similar effect at the pointer 17, that is, the pointer 17 will move to the left an amount equal to the movement of pointer 6. It will be seen that when the pointers 6 and 17 are brought into parallelism by the movement of the pointer 17 at the receiving instrument, they will remain in this position because the long end of one of the resistance coils 4 and 15 will be connected with the short end of the other coil. This will equalize the current flowing through the coils 9 and 10 of the solenoid 8, establishing equilibrium, and the pendulum 30 will move back to its normal or vertical position at its lower end and open the secondary metallic circuit.

Having described my invention what I claim as new and desire to secure by Letters Patent is:

1. An apparatus of the class described, comprising circuit forming elements made up of a ground conductor, an indicator brush, a resistance, parallel conductors extending from the resistance, each including a coil, a second resistance connected with said conductors, a second indicator brush, a conductor including a source of electrical energy and a ground connection for said conductor, auxiliary circuits governed by said coils, and means governed by said auxiliary circuits to move the second brush indicator in exact relation with the first indicator brush.

2. An apparatus of the class described, comprising an indicator brush having a ground connection, a resistance connected thereunto, parallel conductors connected to the ends of said resistance, each of said parallel conductors including a magnetic coil, a second resistance connected with said parallel conductors, a second indicator brush, a battery connected with said brush and a ground connection for said battery, a pivoted contact having projecting portions extending into said magnetic coils, solenoids to impart motion to said second brush indicator, and means controlled by the pivoted contact to energize said solenoids.

3. An apparatus of the class described, comprising brush indicators, one of which has a direct ground connection and the other of which has a ground connection including a battery, resistances connected with said brush indicators, parallel conductors connecting said resistances, each of said conductors including a magnetic coil, a swinging contact connected with the battery and actuated by the said coils for moving it in one direction or the other, means for moving the brush indicator in correct relation with the other comprising solenoids, contacts connected with said solenoids by suitable conductors and arranged to be engaged by the said swinging contact, a conductor connecting the said solenoids with the battery adapted to be completed by said swinging contact whereby one solenoid or the other will be operated for turning the indicator brush connected therewith, and a pulley operated by said solenoids for actuating the said brush indicator.

In witness that I claim the foregoing I have hereunto subscribed my name this 8th day of April, 1910.

GUSTAF A. CLINGWALD.

Witnesses:
H. L. DUNCAN,
ROBT. GUY.